United States Patent [19]

Nebelung

[11] Patent Number: 4,548,633
[45] Date of Patent: Oct. 22, 1985

[54] DETECTING THE TEMPERATURE OF MOULDS OF A GLASSWARE FORMING MACHINE OF THE INDIVIDUAL SECTION TYPE

[75] Inventor: Hermann H. Nebelung, Zurich, Switzerland

[73] Assignee: Emhart Industries, Inc., Farmington, Conn.

[21] Appl. No.: 666,599

[22] Filed: Oct. 31, 1984

[30] Foreign Application Priority Data

Nov. 16, 1983 [GB] United Kingdom ............... 8330572

[51] Int. Cl.⁴ .................................................. C03B 9/40
[52] U.S. Cl. .......................................... 65/29; 65/158; 65/159; 65/162
[58] Field of Search ............... 65/29, 158, 159, 160, 65/162

[56] References Cited

U.S. PATENT DOCUMENTS

| | | | |
|---|---|---|---|
| 3,332,765 | 7/1967 | Champlin | 65/162 |
| 3,574,587 | 4/1971 | Grundy et al. | 65/158 |
| 4,205,973 | 6/1980 | Ryan | 65/29 |

FOREIGN PATENT DOCUMENTS

WO82/02881 9/1982 PCT Int'l Appl. ............ 65/162

*Primary Examiner*—Arthur Kellogg
*Attorney, Agent, or Firm*—H. Samuel Kieser

[57] ABSTRACT

An infra-red detecting device is mounted for turning movement about a vertical axis which lies in a plane which is substantially equi-distant from the centre-lines of two adjacent sections of the machine. The device is turned through an arc about the vertical axis between a first orientation, in which it receives radiation from a mould portion of a first of the sections which radiation is used to detect the temperature of the mould portion, and a second orientation, in which it receives radiation from a mould portion of the other section.

10 Claims, 3 Drawing Figures

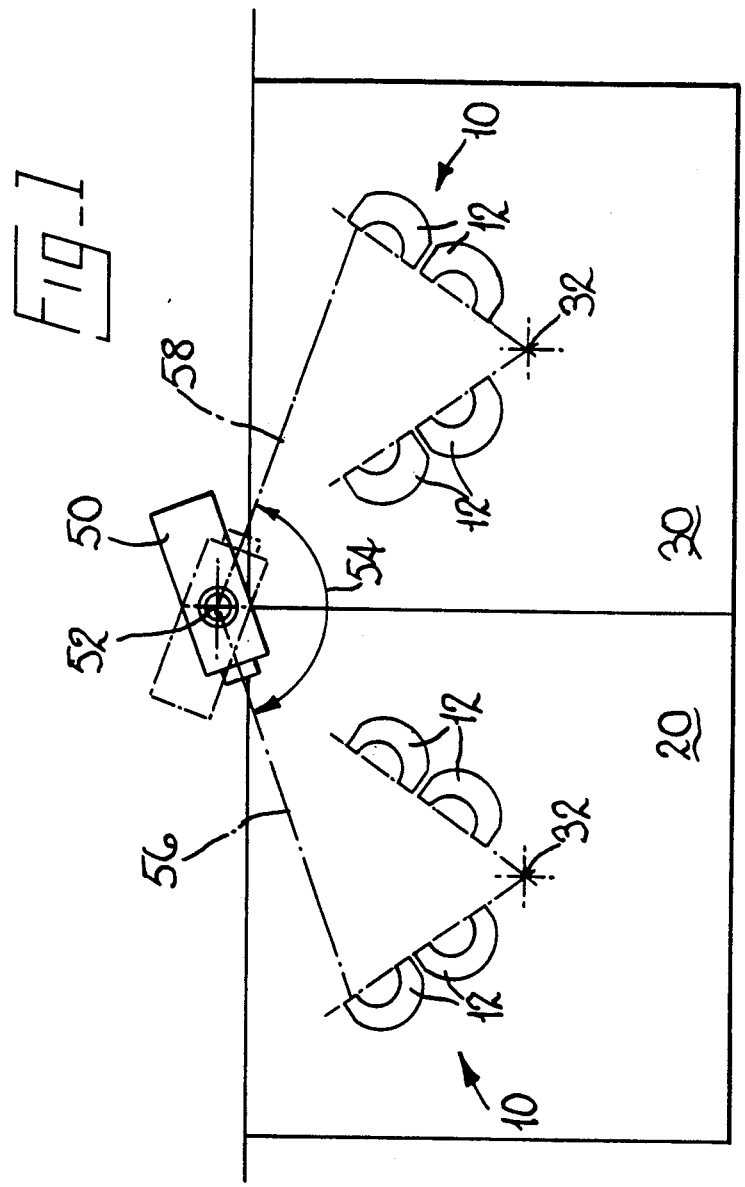

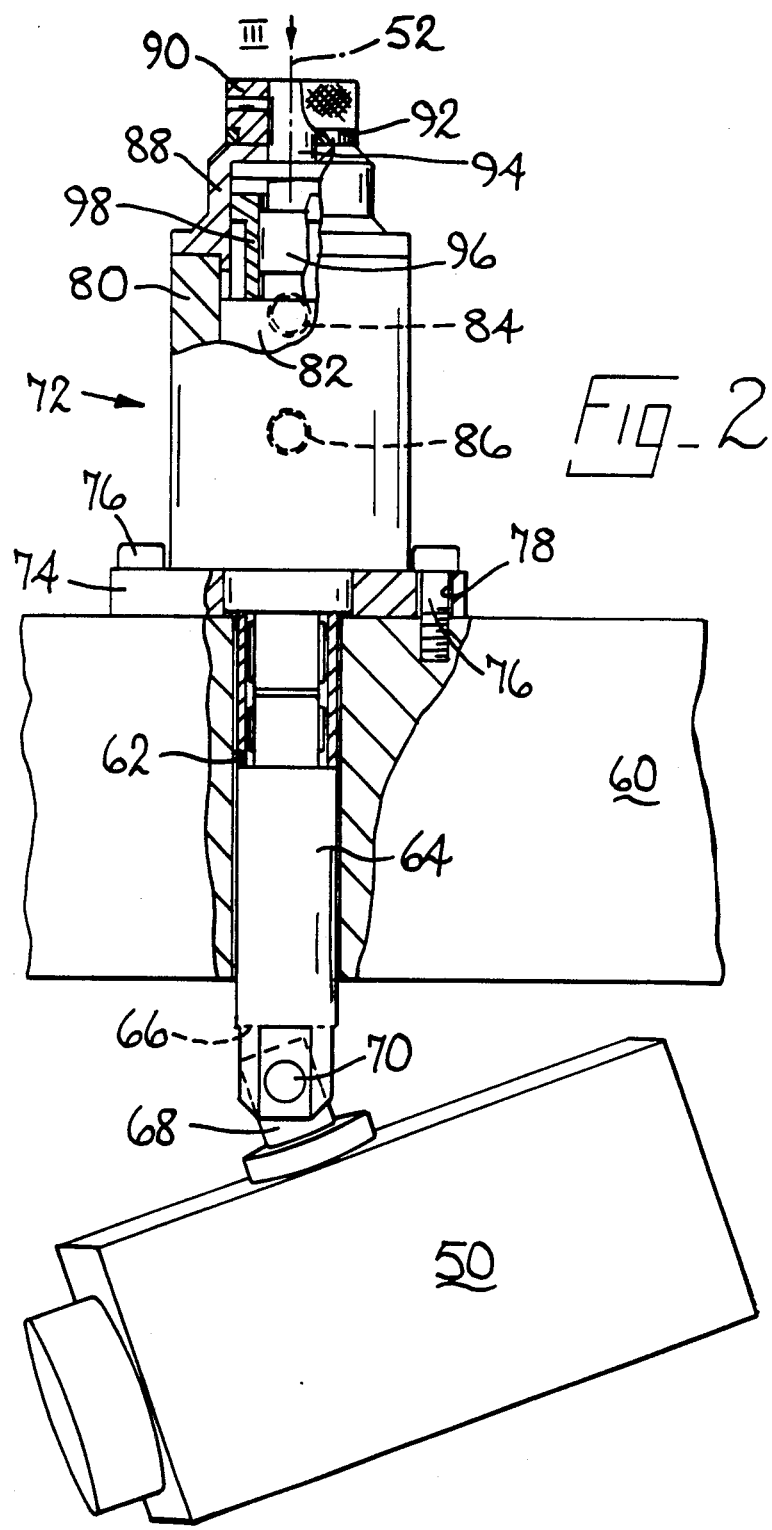

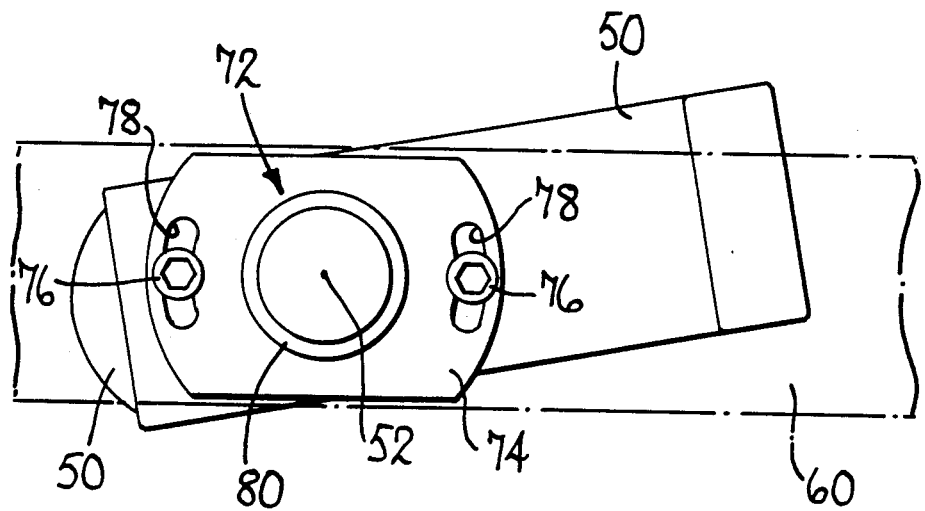
Fig_3

DETECTING THE TEMPERATURE OF MOULDS OF A GLASSWARE FORMING MACHINE OF THE INDIVIDUAL SECTION TYPE

BACKGROUND OF THE INVENTION

This invention is concerned with a method of detecting the temperature of moulds of a glassware forming machine of the individual section type by detecting infra-red radiation emitted from portions of the moulds and is also concerned with a glassware forming machine of the individual section type comprising a plurality of sections each of which comprises at least one mould arrangement by which mould portions are moved, in the operation of the section, between mould-open and mould-closed positions thereof to open or close at least one mould in which molten glass is moulded, and detecting means operable to detect the temperature of mould portions by detecting infra-red radiation emitted thereby.

Glassware forming machines of the individual section type are well-known and comprise a plurality, e.g. six, of sections or individual moulding units arranged side by side to receive gobs of molten glass from a common gob distributor. Each section comprises mould arrangements which mould gobs of molten glass received from the distributor into parisons and the parisons into articles of glassware. The distributor is arranged to deliver gobs to the sections in turn and the sections therefore operate in timed relationship to one another such that, at any given time, each section is at a different stage of its operation. During the operation of a section, the moulds thereof are cooled to keep their temperature within a desired range and, to enable optimum working conditions to be achieved, it is desirable to detect the temperature of the moulds of a section so that the cooling means therefor can be adjusted to maintain the desired temperature. However, the environment in the vicinity of the moulds of a section is hostile to temperature detecting devices so that it is difficult to provide reliable temperature detecting devices in or around the moulds.

It is known to detect the temperatures of moulds of a glass moulding machine which is not of the individual section type by detecting infra-red radiation emitted from portions of the moulds (see UK Patent Specification No. 1390787). However, in a machine of the individual section type, this method has hitherto not been adopted, so far as is known, because of the expense of providing one infra-red radiation detecting device for each section. It is not practical to provide one infra-red radiation detecting device for the entire individual section type glassware forming machine and move it from section to section during the operation of the machine to detect the temperatures of the moulds of all the sections in turn because of the high speed of operation of the machine.

It is an object of the present invention to provide a method of detecting the temperature of moulds of a glassware forming machine of the individual section type by detecting infra-red radiation emitted from portions of the moulds in which only one infra-red detecting device is used for every two sections of the machine thereby reducing the expense of using this method of temperature detection in this type of machine.

BRIEF SUMMARY OF THE INVENTION

The invention provides a method of detecting the temperature of moulds of a glassware forming machine of the individual section type by detecting infra-red radiation emitted from portions of the moulds, the method comprising mounting an infra-red radiation detecting device for turning movement about a vertical axis which lies in a plane which is substantially equi-distant from the centre-lines of two adjacent sections of the machine, turning the detecting device through an arc about said vertical axis between a first orientation thereof in which the device is arranged to receive radiation from a mould portion of a first of the adjacent sections and a second orientation thereof in which the device is arranged to receive radiation from a mould portion of a second of the adjacent sections, the detecting device being turned in timed relationship to the operation of the adjacent sections so that the detecting device is in its first orientation when the mould portion of the first section is in a mould-open position thereof and the detecting device is in its second orientation when the mould portion of the second section is in a mould-open position thereof, radiation detected by the detecting device, when it is in its first orientation, being used to determine the temperature of the mould portion of the first section and radiation detected by the detecting device, when it is in its second orientation, being used to determine the temperature of the mould portion of the second section.

In a method according to the last preceding paragraph, a single detecting device operating twice in each cycle of operation of the machine is utilised to detect the temperature of moulds of two adjacent sections of the machine so that the machine has only half as many detecting devices as there are sections.

The invention also provides a glassware forming machine of the individual section type comprising a plurality of sections each of which comprises at least one mould arrangement by which mould portions are moved, in the operation of the section, between mould-open and mould-closed positions thereof to open or close at least one mould in which molten glass is moulded, and detecting means operable to detect the temperature of mould portions by detecting infra-red radiation emitted thereby, the detecting means comprising at least one infra-red radiation detecting device mounted for turning movement about a vertical axis which lies in a plane which is substantially equi-distant from the centre-lines of two adjacent sections of the machine, and turning means operable to turn the detecting device through an arc about said vertical axis between a first orientation thereof in which the device is arranged to receive infra-red radiation from a mould portion of a first of the adjacent sections so that the temperature of the mould portion can be determined from the radiation received by the device, and a second orientation thereof in which the device is arranged to receive infra-red radiation from a mould portion of a second of the adjacent sections so that the temperature of the mould portion can be determined from the radiation received by the device, the turning means being operable in timed relationship with the operation of the adjacent sections so that the device is in its first orientation when the mould portion of the first section is in a mould-open position thereof and the device is in its second orientation when the mould portion of the second section is in a mould-open position thereof.

Conveniently, the turning means may comprise a drive shaft extending along the vertical axis, the detecting device being mounted on the drive shaft, motor means operable to turn the drive shaft, and control means operable to operate the motor means in timed relationship with the operation of the sections.

In order to allow adjustment of the first and second orientations of the detecting device, the motor means and the drive shaft may be mounted to be turned about the vertical axis to adjust said orientations. Furthermore, the length of the arc through which the motor means turns the drive shaft and the detecting device may be adjustable to allow adjustment of the orientations of the detecting device. Conveniently, the motor means and the drive shaft are turned about the vertical axis to adjust one of the orientations and the length of the arc through which the motor means turns the drive shaft and the detecting device is adjusted to adjust the other of the orientations.

In order to enable the detecting device to be accurately pointed at the mould portions from which it is to receive radiation, the detecting device may be mounted on the drive shaft so that it can be turned about a horizontal axis.

In order to provide a compact and reliable motor means, the motor means may comprise a rotary hydraulic motor comprising a cylinder, and a piston movable within the cylinder, the piston having a screw-threaded connection with the cylinder such that, when the piston is moved along the cylinder, it is caused to turn about a longitudinal axis of the cylinder, the piston also having a connection with the drive shaft such that, when the piston turns about the longitudinal axis of the cylinder, the drive shaft turns. Conveniently, the connection between the piston and the drive shaft may be a screw-threaded connection of opposite hand to the connection between the piston and the cylinder thereby providing a more compact arrangement. Where the length of the arc through which the motor means turns the drive shaft is adjustable, an adjustable stop member may be arranged to limit the movement of the piston along the cylinder to thereby adjust the length of said arc.

BRIEF DESCRIPTION OF THE DRAWINGS

There now follows a detailed description, to be read with reference to the accompanying drawings, of an illustrative method of detecting the temperature of moulds of a glassware forming machine of the individual section type and an illustrative glassware forming machine of the individual section type. It is to be understood that the illustrative method and the illustrative machine have been selected from description by way of example and not a limitation of the invention.

In the drawings:

FIG. 1 is a diagrammatic plan view of the illustrative glassware forming machine;

FIG. 2 is a front-elevational view, partly in section, of an infra-red radiation detecting device and turning means therefor of the illustrative machine; and FIG. 3 is a view taken in the direction of the arrow III in FIG. 2.

DETAILED DESCRIPTION OF PREFERRED EMBODIMENT OF THE INVENTION

The illustrative glassware forming machine is of the individual section type and comprises a plurality of sections of which two are diagrammatically indicated in FIG. 1. Each section comprises at least one mould arrangement 10 by which mould portions 12 are moved, in the operation of the section, between mould-open positions (shown in FIG. 1) and mould-closed positions thereof to open or close moulds in which molten glass is moulded. Two adjacent sections of the illustrative machine 20 and 30 are represented by rectangles in FIG. 1. Each section 20 and 30 has a mould arrangement 10 comprising arms (not shown) which support the mould portions 12. The arms are moved about a vertical axis 32 to move the mould portions between their mould open and mould-closed positions. Mould arrangements of this type are conventional in glassware forming machines of the individual section type and therefore will not be described in detail therein.

The illustrative machine also comprises detecting means operable to detect the temperature of mould portions 12 by detecting infra-red radiation emitted thereby. The detecting means comprises an infra-red camera 50 which is mounted for turning movement about a vertical axis 52 (see FIG. 1) which lies in a plane substantially equi-distant from the centre-lines of the two adjacent sections 20 and 30. Thus, the axis 52 lies on the line of separation of these sections 20 and 30. The illustrative machine also comprises turning means operable to turn the camera 50 through an arc 54 about the axis 52 between a first orientation thereof (shown in solid line in FIG. 1) in which the camera 50 is arranged to receive infra-red radiation from a mould portion 12 of a first 20 of the adjacent sections so that the temperature of the mould portion 12 can be determined from the radiation received by the camera 50, and a second orientation thereof (shown in broken line in FIG. 1) in which the camera 50 is arranged to receive infra-red radiation from a mould portion 12 of a second 30 of the adjacent sections so that the temperature of the mould portion can be determined from the radiation received by the camera 50. The line of sight of the camera 50 in its first orientation is indicated by the line 56 in FIG. 1 and the line of sight of the camera 50 in its second orientation is indicated by the line 58. The turning means is operable in timed relationship with the operation of the sections 20 and 30 so that the camera 50 is in its first orientation when the mould portion 12 of the first section 20 is in a mould-open position thereof and the camera 50 is in its second orientation when the mould portion 12 of the second section 30 is in a mould-open position thereof. It should be noted that, although the mould portions 12 of both sections 20 and 30 are shown in FIG. 1 in a mould open position thereof, in operation of the machine the mould portions of the sections 20 and 30 will not be in mould-open positions simultaneously. The time during which the mould portions 12 of the section 20 are in a mould-closed position thereof is utilised to measure the temperature of the mould portions of the section 30 which are then in a mould-open position thereof. Ideally, the delivery of gobs of molten glass to the sections 20 and 30 will be separated by half the length of the cycle of operation of the glassware forming machine so that the maximum amount of time is allowed for the camera 50 to swing through the arc 54 and back again.

The turning means of the illustrative machine is mounted on a manifold 60 of the machine which is present in conventional machines and extends above all the sections of the machine in a direction transversely to the centre lines of the sections. The manifold 60 is located above the level of the mould arrangements of the sections and can be utilised to support one camera 50 for every two sections of the machine. Thus, if the sections are numbered from one end of the row thereof, one camera 50 is associated with sections 1 and 2, another camera 50 is associated with sections 3 and 4 and so on. The manifold 60 has a cylindrical passage 62 extending vertically therethrough in which a drive shaft 64 of the turning means is mounted for turning movement about the axis 52 which is aligned with a longitudinal axis of the shaft 64. A lower end portion of the drive shaft 64, beneath the manifold 60, has a vertically extending slot 66 therein in which a mounting projection 68 of the camera 50 is received and is held in place by a clamping screw 70. The arrangement is such that the camera 50 can be turned about the horizontal axis of the clamping screw 70 to aim the camera at the mould portions 12 and can then be clamped in position by tightening the clamping screw 70. Since the manifold 60 is located above the level of the mould arrangements 10, the camera is angled downwardly to aim it at the mould portions 12.

The turning means of the illustrative machine also comprises motor means operable to turn the drive shaft 64 so that the camera 50 is moved through the arc 54. The motor means is provided by a rotary hydraulic motor 72 (see FIG. 2). The motor 72 is mounted on a flange 74, through an aperture in which the drive shaft 64 passes, which flange 74 is secured to the top of the manifold 60 by screws 76. The motor 72 is thus mounted on top of the manifold 60 with the drive shaft 64 passing downwardly through the passage 62 and having the camera 50 mounted thereon beneath the manifold 60. The screws 76 are received in slots 76 (see FIG. 3) in the flange 74 which are arcuate about the axis 52. The arrangement is such that the flange 74 can be turned on the manifold 60 to an extent limited by the slots 78 and then clamped in position by tightening the screws 76. This adjustment of the flange 74 turns the motor 72 and the drive shaft 64 about the vertical axis 52 to adjust the first or the second orientation of the camera 50. The turning means also comprises control means in the form of valves (not shown) which are operable to operate the motor 72 in timed relationship with the operation of the sections 20 and 30. The valves supply hydraulic fluid to the motor 72 in response to impulses taken from the main timing system for the machine which also provides impulses which cause opening and closing of the moulds of the mould arrangements of the sections 20 and 30. Thus, in each cycle of operation of the machine, at the same relative time the moulds of the sections 20 and 30 are opened and closed and also at the same relative time the turning means operates to move the camera 50 through the arc 54.

The motor 72 comprises a cylinder 80 and a piston 82 movable within the cylinder. The piston 82 has a screw-threaded connection (not shown) with the cylinder 80 such that, when the piston is moved along the cylinder 80, it is caused to turn about a longitudinal axis of the cylinder which is aligned with the axis 52. Thus, when hydraulic fluid under pressure is introduced into a upper port 84 of the cylinder 80, the piston 82 is moved downwardly in the cylinder 80 and caused to turn about the axis 52 in an anti-clockwise direction, and, when hydraulic fluid under pressure is introduced into a lower port 86 of the cylinder 80, the piston 82 is caused to move upwardly in the cylinder 80 and to turn clockwise about the axis 52. The piston 82 also has a connection with the drive shaft 64 such that, when the piston turns about the axis 52, the drive shaft 64 turns. The connection between the piston 82 and the drive shaft 64 is a screw-threaded connection (not shown) of opposite hand to the connection beteen the piston 82 and the cylinder 80.

The connection between the piston 82 and the drive shaft 64 is formed between an upper portion of the drive shaft 64 which is received in a recess in the piston 84 and the interior of the recess in the piston 82. As the two screw-threaded connections are of opposite hand, when the piston 82 turns about the axis 52, the shaft 64 turns twice as fast. The drive shaft 64 is restrained against longitudinal movement by a flange thereof (not shown) which is mounted on bearings within the cylinder 80.

The cylinder 80 has an upper end cap 88 on top of which an adjusting knob 90 is mounted for turning movement about the vertical axis 52, the amount of turn being indicated by a scale 92 mounted on the end cap 88. The knob 90 is pinned to a shaft 94 which extends downwardly into the cylinder 88 and has a lower end portion 96 which is threadedly received in a vertical passage through an adjustable stop member 98 which is arranged to limit the upwards movement of the piston 82 by engagement between the piston 82 and a lower end portion of the stop member. The arrangement is such that, when the knob 90 is turned, the stop member 98 is moved upwardly or downwardly within the cylinder 80 so that the movement of the piston and thereby the length of the arc 54 through which the camera is turned is adjusted. Thus the length of the arc 54 through which the motor 72 turns the drive shaft 64 and the camera 50 is adjustable.

In order to adjust the first and the second orientation of the camera 50, the camera 50 is first adjusted about a horizontal axis to point downwardly at the correct angle and the clamp screw 70 is tightened. Next, the motor 72 and the drive shaft 64 are turned about the axis 52 until the camera 50 is in its first orientation and the screws 78 are tightened to maintain that first orientation, this adjustment being carried out with the piston 82 in its lower most position in the cylinder 80. Finally, the knob 90 is turned to adjust the length of the arc 54 thereby adjusting the second orientation of the camera 50.

The illustrative machine described above is used in the illustrative method of detecting the temperature of moulds of a glassware forming machine of the individual section type by detecting infra-red radiation emitted from portions of the moulds. In the method, the infra-red camera 50 is mounted as aforesaid for turning movement about the vertical axis 52 and, in the operation of the machine, the camera 50 is turned through the arc 54 about the axis 52 between its first and its second orientations in timed relationship to the operation of the adjacent sections 20 and 30. The turning of the camera 50 is carried out by operating the motor 72 so that the camera is in its first orientation when the mould portion 12 of the section 20 is in an mould open position thereof and the camera 50 is in its second orientation when the mould portion 12 of the second section 30 is in a mould-open position thereof. Also in the illustrative method radiation detected by the detecting device, when it is in its first orientation, is used to determine the temperature of the mould portion 12 of the first section 20 and radiation detected by the camera 50, when it is in its second orientation, is used to determine the temperature of the mould portion 12 of the second section 30.

In the illustrative method and the illustrative machine, there is only one camera 50 for every two sections 20 and 30 from which temperature readings are taken. This results in a less expensive arrangement than if there were one camera for each section.

I claim:

1. A method of detecting the temperature of moulds of a glassware forming machine of the individual section type by detecting infra-red radiation emitted from portions of the moulds, the method comprising mounting an infra-red radiation detecting device for turning movement about a vertical axis which lies in a plane which is substantially equi-distant from the centre-lines of two adjacent sections of the machine, turning the detecting device through an arc about said vertical axis between a first orientation thereof in which the device is arranged to receive radiation from a mould portion of a first of the adjacent sections and a second orientation thereof in which the device is arranged to receive radiation from a mould portion of a second of the adjacent sections, the detecting device being turned in timed relationship to the operation of the adjacent sections so that the detecting device is in its first orientation when the mould portion of the first section is in a mould-open position thereof and the detecting device is in its second orientation when the mould portion of the second section is in a mould-open position thereof, radiation detected by the detecting device, when it is in its first orientation, being used to determine the temperature of the mould portion of the first section and radiation detected by the detecting device, when it is in its second orientation, being used to determine the temperature of the mould portion of the second section.

2. A glassware forming machine of the individual section type comprising a plurality of sections each of which comprises at least one mould arrangement by which mould portions are moved, in the operation of the section, between mould-open and mould-closed positions thereof to open or close at least one mould in which molten glass is moulded, and detecting means operable to detect the temperature of mould portions by detecting infra-red radiation emitted thereby, the detecting means comprising at least one infra-red radiation detecting device mounted for turning movement about a vertical axis which lies in a plane which is substantially equi-distant from the centre-lines of two adjacent sections of the machine, and turning means operable to turn the detecting device through an arc about said vertical axis between a first orientation thereof in which the device is arranged to receive infra-red radiation from a mould portion of a first of the adjacent sections so that the temperature of the mould portion can be determined from the radiation received by the device, and a second orientation thereof in which the device is arranged to receive infra-red radiation from a mould portion of a second of the adjacent sections so that the temperature of the mould portion can be determined from the radiation received by the device, the turning means being operable in timed relationship with the operation of the adjacent sections so that the device is in its first orientation when the mould portion of the first section is in a mould-open position thereof and the device is in its second orientation when the mould portion of the second section is in a mould-open position thereof.

3. A glassware forming machine according to claim 2, wherein the turning means comprises a drive shaft extending along the vertical axis, the detecting device being mounted on the drive shaft, motor means operable to turn the drive shaft, and control means operable to operate the motor means in timed relationship with the operation of the sections.

4. A glassware forming machine according to claim 3, wherein the motor means and the drive shaft are mounted to be turned about the vertical axis to adjust the first or the second orientation of the detecting device.

5. A glassware forming machine according to claim 3, wherein the length of the arc through which the motor means turns the drive shaft and the detecting device is adjustable.

6. A glassware forming machine according to claim 3, wherein the detecting device is mounted on the drive shaft so that it can be turned about a horizontal axis.

7. A glassware forming machine according to claim 3, wherein the motor means comprises a rotary hydraulic motor comprising a cylinder, a piston movable within the cylinder, the piston having a screw-threaded connection with the cylinder such that, when the piston is moved along the cylinder, it is caused to turn about a longitudinal axis of the cylinder, the piston also having a connection with the drive shaft such that, when the piston turns about the longitudinal axis of the cylinder, the drive shaft turns.

8. A glassware forming machine according to claim 7, wherein the connection between the piston and the drive shaft is a screw-threaded connection of opposite hand to the connection between the piston and the cylinder.

9. A glassware forming machine according to claim 7, wherein an adjustable stop member is arranged to limit the movement of the piston along the cylinder to thereby adjust the length of the arc through which the detecting device is turned.

10. A glassware forming machine according to claim 9, wherein the connection between the piston and the drive shaft is a screw-threaded connection of opposite hand to the connection between the piston and the cylinder.

* * * * *